Aug. 18, 1942.  R. A. UNDERWOOD ET AL  2,293,321

CONTROL SYSTEM

Filed Feb. 11, 1941  2 Sheets-Sheet 1

INVENTORS
RALPH A. UNDERWOOD
LOUIS C. SHOVEIN
BY
ATTORNEYS

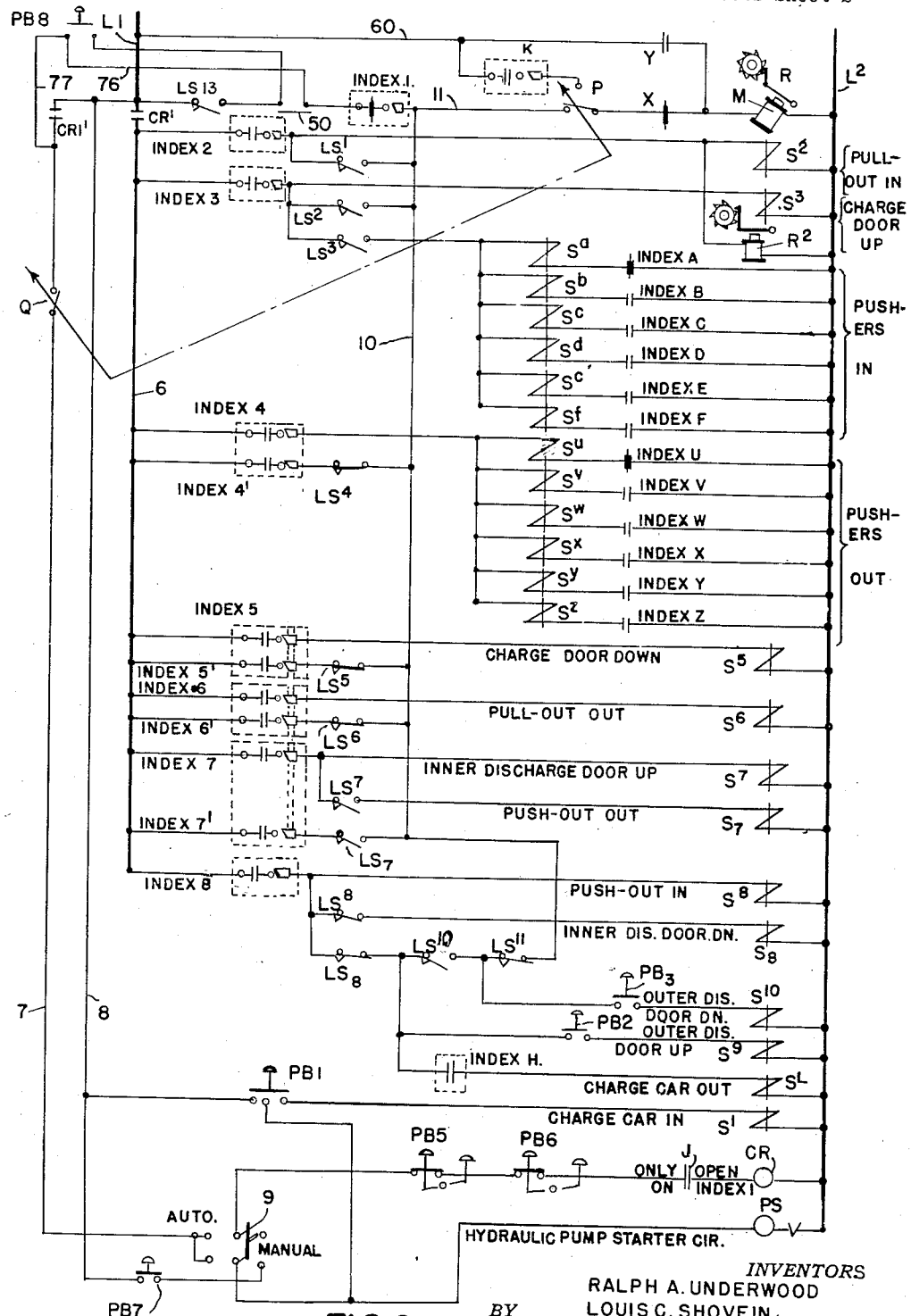

Patented Aug. 18, 1942

2,293,321

UNITED STATES PATENT OFFICE 2,293,321

CONTROL SYSTEM

Ralph A. Underwood and Louis C. Shovein, Detroit, Mich.

Application February 11, 1941, Serial No. 378,484

6 Claims. (Cl. 175—375)

This invention relates to electrical control systems for the regulation of electrically controllable apparatus, and aims to provide novel means whereby apparatus of almost any desired character may be made to perform a predetermined cycle or sequence of operations, the invention having for its principal object the provision of improved means whereby these mechanical operations, even though involving a large number of steps or processes, may be initiated, controlled and stopped in accordance with any desired plan, and by means of a circuit of greatly simplified form, which is much cheaper and quicker to install, occupies much less space, uses far less mechanism, and is simpler and easier to operate, more trouble-free, and more flexible in operation than presently known control systems. A related object is to provide such a control system arranged in such manner that the various steps can occur only in the wanted sequence, without possibility of interference with each other, and which is so arranged that the process may be stopped and restarted at any point or time during the cycle of operations.

While a control circuit incorporating the principles of our invention is disclosed in connection with a heat treating furnace, and associated stock handling apparatus, it will be readily recognized by those skilled in the art that the principles of our improved system are as readily applicable to the control of other apparatus, and that the principles thereof are in fact applicable to apparatus and processes of virtually any desired character, wherein a plurality of successive steps or operations are to be performed.

In the drawings:

Figure 2 is a schematic line diagram of a control circuit incorporating the principles of the present invention, and adapted to regulate the operation of the various parts of such a furnace as is illustratively shown in Figure 1.

General furnace arrangement

Figure 3:
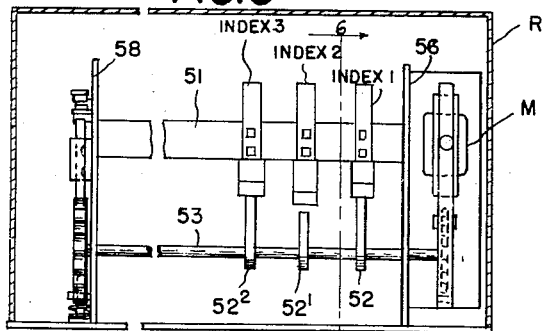
Figure 3 is a longitudinal sectional elevation of the master indexing relay.
Figures 4, 5:
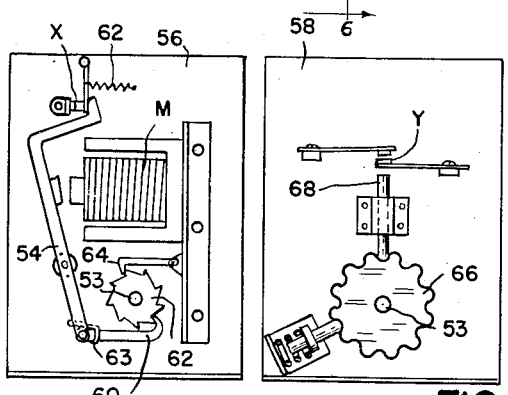
Figures 4 and 5 are left and right end elevational views thereof, respectively, with the cover removed.
Figure 6:
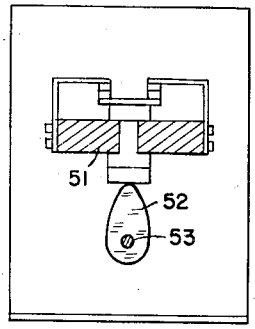
Figure 6 is a cross section taken substantially on the line 6—6 of Figure 3 and looking in the direction of the arrows.
Figure 7:
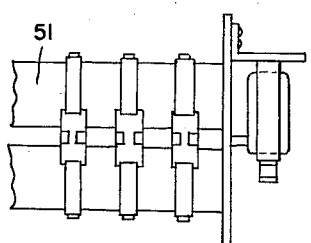
Figure 7 is a fragmentary plan view of the same with the cover removed.
Figure 1:
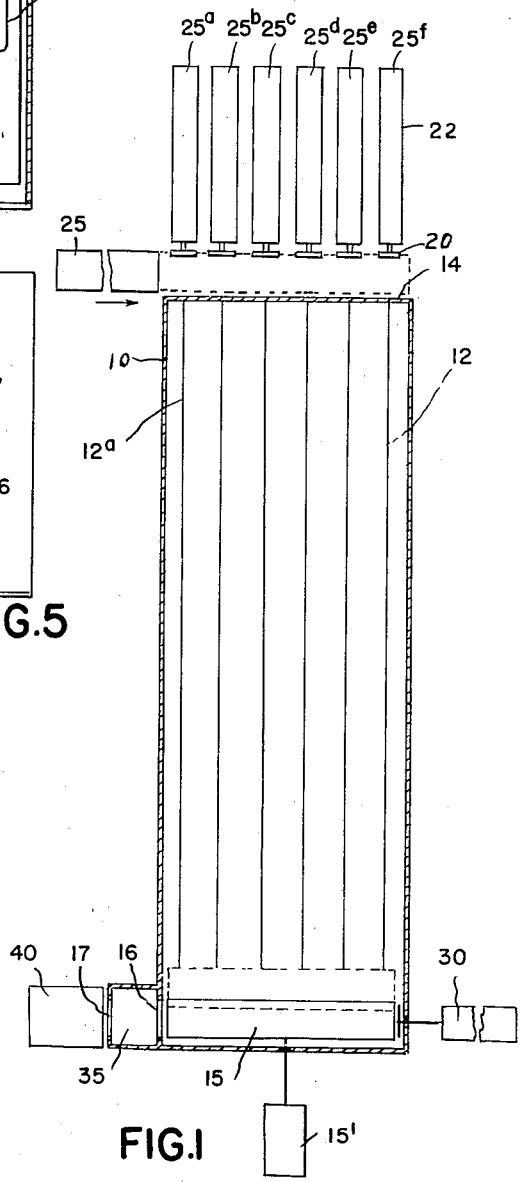
Figure 1 is a diagrammatic plan view of a heat treating furnace and associated apparatus.

Referring now to the drawings: the walls of the illustrated furnace are generally designated 10 in Figure 1. A plurality of stock tracks are diagrammatically indicated at 12. The tracks extend longitudinally through the furnace, to conduct work from the charging end, shown at the top of the figure, whereat the work is fed into the furnace, through a charge door 14, to the discharge end, shown at the bottom, whereat the work is removed, through two discharge doors, comprising an inner door 16 and an outer door 17. The work pieces are lined up on the tracks, and pushed through the furnace from the charging end, so that as a new piece is pushed into the furnace, a finished piece is pushed from the track at the discharge end, for removal by means presently to be described.

The work is pushed automatically, by means of pushers, 20, operated by hydraulic cylinders 22. When the pushers are retracted, a charge car 25, upon which the stock is placed in accordance with the spacing of the tracks 12, may be run between the pusher and the charge door, so that when the charge door is raised, the pusher or pushers may push the stock from the car through the door and into the furnace.

In the illustrative construction herein disclosed the stock moves very slowly through the furnace, several hours elapsing between its introduction and discharge, and although several pushers are provided, only one of these operates at a time, the sequence of operation of the pushers being regulated by a secondary control circuit in a manner which will presently be described in greater detail. The charge car accordingly moves into position, and back for reloading, only once for each six complete cycles of the furnace.

At the discharge end of the furnace, before the pusher operates, a pull-out is moved in position, to receive the stock piece, which is thereby pushed from the track, while after the stock piece is thus pushed onto the pull-out, the latter moves outwardly and into line with the discharge doors, as well as into alignment with a hydraulically operated push-out 30 located opposite the discharge doors. It will be seen that the sequence of operations in the feeding of stock into and removal of stock from this furnace arrangement may be listed as follows:

1—Pull-out 15 moves in
2—Charge door 14 opens
3—Pusher moves in
4—Pusher retracts
5—Charge door closes
6—Pull-out retracts
7—Inner discharge door 16 opens
8—Push-out 30 moves out forcing stock off pull-out and into vestibule 35
9—Push-out retracts
10—Inner discharge door closes Subsequent removal of the stock from the vestibule may be effected by manual operation of the outer discharge door 17 (through the agency of push buttons and suitable electrically controlled operating means).

All of the numbered operations are made to occur automatically in the desired sequence by the mere closing of a single switch in the form of a push button, while completion of the final operation, consisting of removal of stock from the vestibule, resets the entire control apparatus in such manner that it is ready to again run through the same cycle of operations.

Only the control apparatus is included in the line diagram, Figure 2, the actual mechanism by which the parts are made to move being omitted. For example, solenoids as S', S², etc., are shown, adapted to be energized in desired sequence, and each of these is presumed to control a relay circuit or other conventional electrically operated means for closing circuits to motors which provide the motive force for operation of the various doors, hydraulic pumps, etc. While each of these might be drawn in detail, it will be recognized that these parts may be of conventional construction, and that they form no part of the control system which constitutes the present invention, so that the greatly complicated nature of the description which would then be required would detract from rather than add to the clarity of the disclosure. In the interests of simplicity, it is also presumed that all of the apparatus to be operated is motivated by hydraulic fluid under pressure, the pressure being derived from a pump (not shown) operated by an electric motor (not shown), the motor in turn being controlled by the circuit shown at the bottom of Fig. 2 and incorporating a starter PS.

The sequence of the principal operations is under the control of a master cycle index relay, generally designated R. While the construction of this device is subject to variation, it may well consist of a plurality of cam switches operated by a single motivating agency such as the electromagnet M. Details of construction of the relay are shown in Figures 3 to 7 inclusive. The switches of the relay are carried by a common insulating framework 51 and arranged in a row therealong, being respectively designated Index 1, Index 2, Index 3, etc. The switches are operable by means of cams 52, 52', 52², etc. mounted upon a common shaft 53 rotatable in the end plates 56, 58 of the relay assembly and intermittently actuable through the agency of a pawl and ratchet mechanism driven by an armature 54 rockably mounted at 54 upon the end plate 56 of the relay frame and actuable by the electromagnet M. The armature carries the pawl 60, which is constantly urged toward the ratchet wheel 62 by a spring 63, and which rotates the wheel through the distance of one ratchet tooth for each reciprocation of the armature. The ratchet wheel is prevented from backing by a holding pawl 64. A wheel 66 fast on the other end of shaft 53 is provided with rounded detent notches conforming in their angular spacing to the angle through which the shaft is turned upon each actuation of the pawl 60, as well as to the arrangement of the lobes of the cams 52, 52', etc., the arrangement of the cams being such that the next intended switch is actuated, in accordance with the sequence of electrical operations presently to be described, by the turning of the shaft to each of the angular positions thus determined. These positions constitute the several index positions, and the operation of the switch or switches corresponding to each such position initiates an intended operation or series of operations of the controlled apparatus. As each operation is completed, the relay is automatically energized and caused to shift to the next index position, until all operations have been completed, when it resets itself for repetition of the same cycle of operations.

The cycle of operations is initiated by pushing the push button PB1. This supplies current to the solenoid S', the current being supplied from a conductor 8 connected to power line L1. Current is at the same time supplied to the starter PS for the hydraulic pump motor, and the hydraulic operating mechanism supplied thereby is so controlled by the solenoid S' that energization of the latter causes the charge car 25 to move from the retracted position in which it is shown in full lines in Figure 1 to the working position in which it is shown in dotted lines in that view, if the car was previously retracted. Movement of the car into the working position closes a limit switch LS13, so that power can be conducted from line L1 to the electromagnet M of the master relay R upon closure of the repeating clock contactor 50, in series with LS13 and arranged to close the circuit intermittently for a few seconds at predetermined intervals, ordinarily such intervals being of a few minutes duration.

Also in series with LS13 and clock switch 50 is one of the cam switches, index 1, of the master relay R previously described. Assuming the relay to be in the index 1 position, which it occupies at the commencement of the cycle of operations, such cam switch is closed (while all of the other cam switches of this relay are open). Contact X, operated by the pawl and ratchet mechanism of the relay, and also arranged in series with the electromagnet thereof, is also closed at this time, so that the magnet is energized upon closure of the clock contactor. The purpose of the contact switches X, Y will be described later, since they do not enter into the cycle of operations other than to insure proper and positive step-by-step operation of the relay. Energization of M causes the relay to index one position, opening the switch "index 1," and closing a second cam switch of said relay, designated "index 2." The opening of index 1 deenergizes the magnet M and so stops the relay, which has been allowed to index through only one position.

One of the cam switches operated by the relay R, which switch is designated J, is arranged to be open only when the relay is in the index 1 position, and to be closed at all other times. Movement of the relay from the index 1 to the index 2 position therefore closes switch J. In series with J are two normally closed push-type switches PB5 and PB6, and the motor CR of a contact relay which, when energized, closes a pair of contacts CR1, CR1'. CR1 is a power switch arranged in L1 in position to cut off, when open, all index switches of relay R except index 1. CR1' is in series with a branch conductor 7 which is connected to L1 ahead of the power contact CR1. The wire 7 is connected to two of the contact clips of a D. P. D. T. switch 9. These contacts of the switch are marked "Auto." and correspond to the switch position for automatic operation. Throwing of switch 9 to the other position, marked "manual" allows the system to be operated under direct manual control rather than with the various steps following one another automatically. With the switch 9 in the automatic position, the first indexing movement of relay R closes cam switch J, completing a circuit to the motor CR of the contact relay and thereby closing the contacts CR1 and CR1'. Current is then supplied, through conductor 7 and switch 9, to the hydraulic pump starter PS (and the pump therefore continues to operate even after the push button PB8 or clock contact 50 is opened. The operation of the push button PB8 will presently be described more fully). Current is then also supplied to the continuation of the line L1, allowing operation of indexes 2, 3, etc., in their proper sequence.

Index 2 will be seen to be in series with the solenoid $S^2$, which, through suitable electromagnetic and/or hydraulic mechanism supplies fluid to an hydraulic cylinder 15', causing the latter to move the pull-out 15 inwardly toward the tracks 12 and into abutting relation with respect to the ends of the latter, such inward position being indicated in dotted lines in Figure 1. The pull-out is then in position to receive a stock piece which is subsequently pushed from the end of one of the tracks by a selected pusher. Closure of index 2 also energizes a second index relay, generally designated $R^2$, the construction of which may be substantially identical with that of the relay R, the number and arrangement of the cams and switches, however, being adapted to the pusher circuits controlled thereby, which will presently be described.

As the pull-out 15 reaches the inner or dotted position of Figure 1, it engages and closes a limit switch LS'. This will be seen to again supply current to the master index relay electromagnet M, causing the latter to index again to a third position, opening cam switch index 2, and closing the cam switch designated index 3. Index 1 remains open, and in fact the cam switches of each index position are closed individually, throughout the operation, the switches of all other index positions remaining open. The switch index 3 will be seen to be in series with a solenoid designated $S^3$, so that the latter is thereby energized, and acts, through suitable mechanism, most of which is unshown, but which includes the hydraulic system controlled by the pump starter PS, to energize a motor or other appropriate apparatus adapted to raise the charge door.

As the door reaches fully open position, it engages and closes a limit switch $LS^3$, which is connected to a series-parallel circuit incorporating a plurality of solenoids $S^a$, $S^b$, $S^c$, $S^d$, $S^e$, $S^f$. In series with each of the last-mentioned solenoids is a cam switch, these being designated index A, index B, index C, index D, index E, and index F. The cam switches are operated in predetermined sequence by the index relay $R^2$, in such manner that only a single cam switch of this series is closed at any one time, and such switches are operated in predetermined sequence, in accordance with the arrangement of the cams on the shaft of the indexing relay. It will be seen that one such solenoid is provided for each of the pushers, and it is assumed that the order of operation of the pushers is in the alphabetical order of the exponents applied to the reference numeral (25) by which they are denominated in Figure 1.

Assuming for purposes of description that the switch designated index A is closed, closure of $LS^3$ will be seen to energize solenoid $S^a$. This in turn causes inward movement of one of the pushers, which in the illustrated construction is assumed to be the pusher designated $25^a$. Pusher $25^a$ then moves forwardly (downwardly, as shown in Figure 1) far enough to push one of the new stock pieces off the charge car, through the open charge door 14 into the furnace and onto the track $12^a$. As the pusher $25^a$ completes its inward movement, it engages and closes a limit switch $Ls^2$, closure of which again energizes the electromagnet M of the master relay R', causing the latter to index to the fourth position, and thereby simultaneously to close two further cam switches, which are designated index 4 and index 4'. At the same time cam switch index 3 is opened, deenergizing the relay.

Closure of the switch index 4 supplies current to a series-parallel circuit incorporating a plurality of solenoids designated $S^u$, $S^v$, $S^w$, $S^x$, $S^y$ and $S^z$. The corresponding cam switches index U, index V, index W, index X, index Y, index Z, are operated by the relay $R^2$, in such manner that index U is closed and opened simultaneously with index A; index V is closed and opened simultaneously with index B; index W is closed and opened simultaneously with index C, etc. Index U being closed, in the order of operation now being described, solenoid $S^u$ is energized upon closure of index 4 by the master relay. Solenoid $S^u$, through any suitable or conventional power-operated mechanism not necessary to be described, causes pusher $25^a$ to be retracted by its hydraulic cylinder.

As the pusher reaches its fully retracted position, it closes a limit switch $LS^4$, which is in series with cam switch index 4' of the master relay R', the limit switch and the cam being in series with the solenoid $Sm$ of the relay, so that the latter is now again energized, and indexes one further position. ($LS^4$ is opened by forward movement of any one of the pushers, but is shown closed in Figure 2 because the apparatus is assumed to be in the index 1 position, in that view, with all pushers retracted.) In the new position, the switches index 4 and index 4' are opened, all preceding index switches remaining open, and the cam switches index 5 and index 5' are closed. Cam switch index 5 is in series with a solenoid $S^5$, the latter being connected to the charge door operating mechanism in such manner that when energized it causes the door to be closed. As the charge door reaches its fully closed position it engages and closes a limit switch $LS^5$, arranged in series with both the already closed cam switch index 5'; and with the electromagnet of the master relay R'. The latter is now again energized to index the relay to the sixth position, opening the switches index 5—index 5', and closing the switches index 6 and index 6'.

Index 6 is in series with a solenoid $S^6$, the latter being so interconnected with the actuating mechanism for the pull-out 15, that energization of this solenoid causes the pull-out to be retracted to the position in which it is shown in full lines in Figure 1. As the pull-out reaches its fully retracted position, it closes a limit switch $LS^6$, which is arranged in series with the already closed cam switch index 6', and also in series with the electromagnet of the master relay R', thus reenergizing the latter and causing it to index once more, thereby opening the switches index 6, index 6', all preceding index switches remaining open, and two further switches, index 7 and index 7', being thereby closed.

The cam switch index 7 is in series with a solenoid $S^7$, the latter being so connected to the operating mechanism (unshown) for the inner discharge door 16 that the energizing of this solenoid causes door 16 to be opened. As the door reaches its fully opened position, it engages and closes a limit switch $LS^7$ which is arranged in series with the cam switch index 7 and also in series with a solenoid $S_7$. Solenoid $S_7$ is so connected with the operating mechanism for the push-out, the cylinder of which is designated 30, that energization of this solenoid causes the push-out to be moved inwardly with respect to the furnace in such manner as to push the stock off the pull-out 15 and through the open door 16 into the vestibule 35. As the push-out reaches the end of its inward travel, it closes the limit switch $LS_7$, which is arranged in series with the cam switch index 7′, and with the electromagnet of the master relay R′, causing the latter to index once again and thereby to open the switches index 7, index 7′, all preceding index switches of course remaining open, as previously explained the cam switch index 8 being thereby closed.

Cam switch index 8 is in series with a solenoid $S^8$, which is so connected to the operating mechanism for the push-out, as to cause the latter to be retracted. As the push-out reaches its fully retracted position, it closes $Ls^8$, a limit switch in series with another solenoid, $S_8$, so interconnected with the operating mechanism (unshown) for the inner discharge door 16 as to cause the latter to be closed. As the inner discharge door reaches its fully closed position, it closes $LS_8$, a limit switch in series with a normally opened push button PB2 and with a contact, designated index H, which is incorporated in the switch mechanism of the pusher selector index relay $R^2$. In series with the contact index H is a solenoid $S^h$, while in series with PB2 is a solenoid $S^9_2$. Cam switch index H is closed by the selector relay R after the latter has run through the full cycle of operation of all pushers, and has thereby emptied the charge car 25, and closure of index H, by energizing solenoid $S^h$, causes the latter to move the charge car outwardly (by suitable unshown mechanism) to allow the latter to be reloaded. This occurs, in the shown arrangement, once for each six complete cycles of operation of the master relay R and of the main system controlled thereby.

The operator next closes the push button PB2, thereby energizing solenoid $S_9$, which through suitable operating mechanism (unshown) raises the outer discharge door 17, to permit removal of the work from the vestibule, which removal may be accomplished either manually or in any other desired manner. The stock, in its movement from the vestibule, and as it comes to rest on the discharge table 40, closes another limit switch $LS10$, which is in series with a normally open push button PB3 and with a solenoid $S^{10}$ connected through suitable unshown mechanism with the operating means for the outer discharge door, causing the latter to be closed.

As the outer discharge door reaches its fully closed position, it closes a limit switch LS11, which completes a circuit through switches $LS8$, $Ls10$, $LS11$, and index 8 to the electromagnet M of the master relay R. This causes the relay to index one further position, and in the illustrated embodiment of the invention, returns the relay to the index 1 position, closing index 1 and thereby putting the entire furnace operating mechanism in condition for another cycle of operation.

Upon return of the master relay to the index 1 position, contact J is opened, opening contacts CR1 and CR1′. Provided the charge car is in the operative position so that LS13 is closed, the electromagnet M is energized upon closure of the clock contact 50, as before, and the cycle recommences, contact J being closed as the relay moves to the index 2 position.

The push button PB8 constitutes a hand or emergency start button by which the system may be made to function at any time independently of the clock contactor, while push buttons PB5 and PB6, which may be located on opposite ends of the furnace or at other convenient points, constitutes emergency stop means by which contacts CR1, CR1′ may be opened at any time to stop the operation of the system.

When the switch 9 is in the manual position, current is applied directly to the hydraulic pump starter circuit whenever a push button PB7 is closed. This enables direct manual starting and control of the various hydraulically energized components which are normally controlled by the electrical system. With the hydraulic fluid supplied in this way, the control valves or other controlling agencies may be shifted by hand to enable operation of the parts under direct hand control.

The contacts X, Y are so arranged as to insure full and proper indexing of the relay at each energization of the electromagnet M. Switch X is in series with the magnet and with the wire 10 which conducts current thereto upon closure of the several limit switches, and is normally held closed by the armature 54 while the magnet is deenergized (Fig. 4), but opens, under the influence of a spring 62, as soon as the armature begins to move toward the magnet. Switch Y closes as or slightly before switch X opens, and reopens as the camshaft completes its full indexing movement, to maintain current to the magnet, through a supply conductor 60, during indexing. Switches X, Y are mounted upon the end plates 56, 58, respectively, of the relay assembly. Switch Y is actuated by the detent wheel 66, through the agency of the plunger 68, which has a rounded end engaging the conformably shaped teeth of the wheel, and this switch will be seen to maintain current to the magnet while the camshaft 53 is in the act of turning through one index position, even through the index switch through which current is supplied to the wire 10 may open slightly before the full indexing has occurred.

The switch arrangement designated by the reference characters P, Q in Figure 2 consists of two switch arms which may be manually operated, simultaneously, through suitable mechanical connecting means. In fact an ordinary D. P. D. T. switch may be used. When both switch arms are closed in the manner shown, the system operates as already described. When the arms are moved to their other positions, in which Q is open and P connects cam switch K across the wires 60, 11, the relay R, if in any position other than index 1, will continue to index rapidly until it has returned to the index 1 position, and then stop. K is a cam switch operated by the relay in a manner similar to the cam switch J, remaining closed at all times except when the relay is in the index 1 position. It is believed that the function of this arrangement will be evident. Since current is then supplied directly from L1 to both switches X, Y, one or the other of which is always closed, the relay, regardless of the position it may occupy, will continue to turn until K opens at index 1.

We are aware that the invention may be embodied in other specific forms without departing from the spirit or essential attributes thereof, and we therefore desire the present embodiment to be considered in all respects as illustrative and not restrictive; reference being had to the appended claims rather than to the foregoing description to indicate the scope of the invention.

We claim:

1. Control means for a system comprising a plurality of sequentially operable controlled devices, comprising in combination with a source of electric power, an electrically operable step-action relay incorporating a plurality of switches, motor means for operating said relay to open and close said switches in predetermined sequence, each of the switches being connected to said source of power and arranged in series with and adapted to control desired devices forming a part of said system, each of said switches also being included in a series circuit incorporating both the motor means and a normally open limit switch closable by one of said controlled devices, whereby completion of a predetermined operation by each of said sequentially operable controlled devices completes a circuit to said motor means, which is thereby intermittently operated as each controlled device completes a predetermined operation, each such energization of said motor means in response to closure of each of said limit switches acting to open the relay switch in the corresponding series circuit and to close a subsequently acting relay switch, whereby the motor means is deenergized until closure of the limit switch which is in circuit with the last mentioned relay switch in response to completion of its operation by the next of the sequentially operable devices again energizes said motor means.

2. Means as set forth in claim 1 including a second indexing relay having a motor means arranged in circuit with one of said switches, whereby said second relay is indexed concurrently initiation of the operation of one of the controlled devices, and means controlled by the first mentioned indexing relay for energizing devices subordinately selected by said second indexing relay.

3. A step-action relay comprising in combination with electromagnetic motor means, a plurality of independently operable switches, cam means for operating the switches drivable by said motor means, and means for insuring full turning movement of said cam means through a predetermined travel upon intermittent energization of said motor means, comprising a normally open shunt contact connected to said motor means and bridging the circuit through which said motor means is intermittently energized and adapted to be connected to a source of power, and means for closing said contact while said cam means is turning through a predetermined movement.

4. Means as set forth in claim 3 including a normally closed series contact arranged in said circuit through which the motor means is normally intermittently energized, and means responsive to turning movement of said cam means for opening said series contact and closing said shunt contact as said cam means is moving through its intended travel.

5. In combination with a source of electrical energy, a plurality of switches adapted to control desired apparatus and a step-action relay mechanism for actuating the switches comprising motor means, means including an oscillable element connecting said motor means and switches, means for intermittently energizing said motor means, and means for controlling the duration of each such intermittent energization, comprising a normally closed switch in series with the motor means and with said means for intermittently energizing the same, means for opening said switch in response to movement of the oscillable element away from the position it occupies when the motor means is deenergized, and for maintaining the switch open until said oscillable element returns to said deenergized position, normally open shunt holding switch also in series with said motor means and connected to said source of power, and means for closing said holding switch during movement of the relay mechanism through a predetermined travel.

6. In combination with means as set forth in claim 5, means for actuating said relay-operated switches to establish the same in any predetermined setting independently of said means for intermittently energizing the motor means, comprising a normally closed resetting switch also connected in series with said motor means and first mentioned switch, and connected to said source of power, and means for opening said resetting switch in response to attainment of a predetermined position by the relay mechanism.

LOUIS C. SHOVEIN.
RALPH A. UNDERWOOD.